Nov. 26, 1940.　　　E. F. W. KEIHL, JR　　　2,223,109

BALE TIE

Filed Feb. 2, 1940

Inventor

Ernest F.W. Keihl Jr.

By

Attorney

Patented Nov. 26, 1940

2,223,109

UNITED STATES PATENT OFFICE 2,223,109

BALE TIE

Ernest F. W. Keihl, Jr., Medina, N. Y., assignor of one-half to Louis J. Kinietz, Medina, N. Y.

Application February 2, 1940, Serial No. 317,019

1 Claim. (Cl. 24—27)

The present invention relates generally to bale ties and more particularly to bale ties of the nature described and claimed in my Patent Number 2,032,285, granted February 25, 1936, with respect to which it is the primary object of my present invention to make certain improvements in the interest of safety in use.

It is a well known fact that when a bale held by ties of the character now known, is to be opened, it is common to cut the wire near one of the connections, that is near the loop or hook member of the connection, so that a short section of the complete tie is thus left with one or the other of the connections. At the time the wire is cut, its parts spring away from the instantly expanding bale and there is great danger that the short section will become disengaged at the hook-loop connection and will drop into the loose hay and get into the throats of feeding stock.

It is a requisite of a safe effective bale tie connection that after once subjected to the strain of holding a bale, it will be proof against the accidental displacement of the connecting members even when the pressure of the bale is eliminated by cutting of the bale wire, and, since my bale tie as shown in my patent above mentioned is open to the possibility of separation of its members when a bale is opened, it is an object of the present invention to improve the same in certain respects which will defeat any possibility of separation of the connecting members after use of the tie around a bale.

In carrying my present invention into practical effect it is a further object to follow as closely as possible the proven successful construction of my prior patent, since I have found the same highly efficient in all other respects, and to modify the same only to the extent of slightly changing the hook member in certain respects for a safety lock, and to permit of a substantially shorter loop by reason of which an additional safety lock is brought about in a manner which will hereinafter appear.

In the accompanying drawing, illustrating the present invention and forming a part of this specification, Figure 1 is a top plan view of a portion of a bale showing my improved tie in connection therewith as in use.

Figure 4:
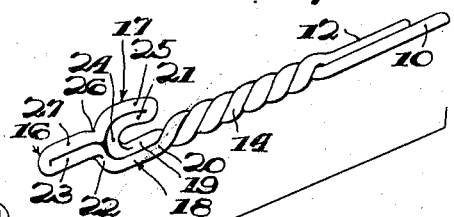

Referring now to the above named figures of the drawing and particularly to Figure 4, both the hook member shown at the right and the loop member shown at the left, are formed in connection with the bale wire 10 by bending back the end portions 11 and 12 of the wire and twisting the extremities of such bent back portions with portions of the body of the wire as at 13 and 14 in a manner to leave at the terminals of the bale tie as a whole a single strand loop member 15 constituting one terminal, and a double strand hook member constituting the other terminal and generally seen at 16.

The loop member 15 is initially formed of generally oblong shape, elongated lengthwise, and of the same width at both ends to form therein an opening which is of the same width throughout its length. In the present construction it is essential that the loop member 15 be as short as possible, or in other words only as long as the width or height of the hook member, which must be passed through the opening of the loop member, requires.

It is to be remembered that, as previously stated the loop member 15 is of single strand construction, meaning that but a single strand encloses its opening at the sides and free end thereof.

The hook member, on the other hand, is distinctly a double strand construction, each part thereof, including the bill 16, hook 17 and shank 18 being formed of two strands of the bale wire 10 beyond the twisted portion 14, the strands in each instance lying in the same plane at right angles to the longitudinal axis of the hook member.

Thus the shank 18, which extends lengthwise beyond the twisted portion 14 consists of inner and outer strands 19 and 20, of which the inner strand 19 is curved laterally and then rearwardly to form the inner strand 21 of the hook 17, and the outer strand 20 is bent to form a lateral inward offset 22 and then extends forwardly to form one of the strands 23 of the substanding straight forwardly extending bill 16, whose plane parallels that of the shank 18 in offset relation thereto. It will be noted that in the present construction the offset 22 intermediate the shank and bill strands 20 and 23 is curved to closely engage and follow a portion of the bight or semi-circularly curved portion 24 closing the forward end of the loop receiving channel of the hook 17, so as to rigidly brace this bight portion 24 for a purpose to be presently described.

The outer strand 25 of the hook 17 extends forwardly in close parallel relation and uniform contact throughout with the inner strand 21 thereof and joins a lateral offset 26 at its forward end, beyond which it continues as the other strand 27 of the bill 16, the offset 26 curving along and closely against the other portion of the bight 24 so that it cooperates with the offset 22 in forming a rigid brace for said bight.

It is to be particularly noted that the strands composing the bill 16, hook 17 and shank 18 parallel one another in each instance in closely, uniformly contacting relation and that this relation of the strands reduces the width of the hook member, which is in thickness no greater than a single strand, to a minimum, so that the loop member 15 need only be such as to provide an opening of the width of but a single strand and a length but slightly greater than the width of the hook member.

Figure 3:
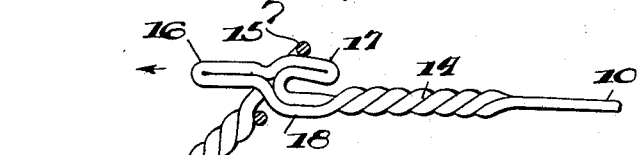
Figure 3 is a sectional perspective view showing the parts of the connection as they are assembled or connected in the first instance in use, and, Figure 4 is a detail perspective view of the two connecting members in detached relation.

It is also to be noted that the hook 17 of the hook member is slightly curved in the direction of its free end toward the shank 18 so as to provide a constricted throat 28 into which the loop member 15 must be snapped when pressure is on the bale and there is sufficient slack in the bale tie as a whole to permit the operator to pass the hook member endwise through the loop member as seen in Figure 3 until the extreme end of the loop member is rearwardly of the hook 17.

Figure 1:
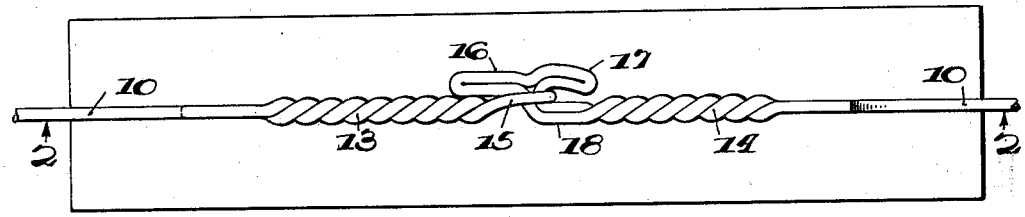
Figure 2:
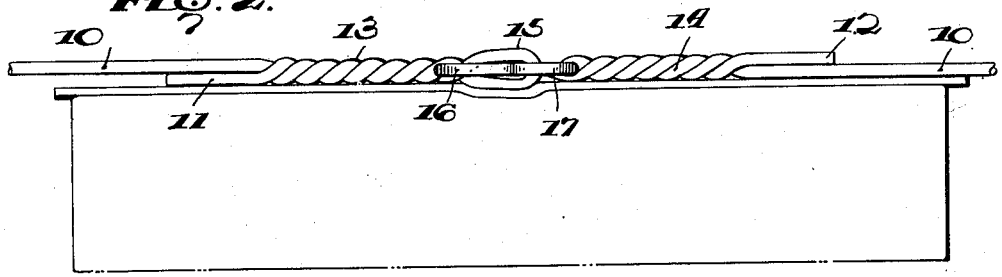
Figure 2 is a vertical longitudinal section through Figure 1 on line 2—2 thereof.

When, after connection of the hook and loop members in the above manner, pressure on the bale is released and acts against the surrounding bale tie, this pressure immediately seeks to stretch or distort any parts of the bale tie connecting members capable of stretching and distortion. In the present instance the double strand hook member is so efficiently braced that its hook, or rather the bight portion 24 cannot yield, and hence the full strain is thrown on or limited to, the single strand loop member 15 of the connection. It has been pointed out that due to the compact construction of the hook member, the loop member may be initially of short length and upon a loop member of this character it has been found that the pressure or strain has a tendency to distort the same by contracting it laterally at its inner or rear portion adjacent to the twisted portion 13, as plainly shown in Figure 2, with the result that its opening is, at this point, reduced in width to less than the width of a single strand of the wire whereby to effectively provide a second locking of the hook member in its engaged position through the loop member.

Due to the foregoing, it is obvious that, in addition to snapping the loop member into engagement with the hook member which constitutes one means or locking feature to avoid the danger of parting of the connected means after they are once joined, the deformation or lateral contraction of the inner portion of the loop member brought about by bale pressure and by reason of the fact that I have provided against any yield or stretch of the hook member, adds a second lock means which precludes all danger of the separation of either member of the connection when the bale wire is severed, as it usually is, near one of the members. I thus avoid any danger of the dropping of loose short end members or pieces which so frequently cause trouble in the feeding of baled hay to stock as first above mentioned.

What is claimed is:

A bale tie comprising a wire having twisted shank portions and provided at one end with an open loop and at the other end with a hook member including a rear hook portion and a front brace portion, said hook portion including a straight base portion extending longitudinally of the bale tie and consisting of two strands of wire arranged in contiguity throughout and a locking portion also consisting of two strands of wire arranged in contiguity throughout, said straight locking portion being inclined and extending inwardly towards the contiguous shank of the bale tie at an angle thereto to form a constricted entrance to the hook and the distance between the rear end of the locking portion and the rear end of the base portion of the hook member being less than the diameter of the wire of the bale tie, said brace portion likewise consisting of two strands of the wire arranged in contiguity throughout, all of the strands occupying substantially the same common plane disposed longitudinally of and coinciding with the longitudinal plane of the bale tie wire, one of said brace portion strands being a continuation of one of the base portion strands and the other of said brace portion strands being a continuation of one of the locking portion strands, the internal length of the loop being slightly greater than the overall width of the hook member and materially less than the length of the front brace portion when the loop is under tension and laterally collapsed to cause a material overlapping of the front brace portion and the twisted shank portion of the loop end of the wire when the loop is engaged by the hook member, and the internal width of the loop being slightly greater than the diameter of the wire whereby stretching of the tie under conditions of use is limited to the contraction of the loop transversely.

ERNEST F. W. KEIHL, Jr.